Dec. 22, 1925.

S. A. SANDBERG

CLUTCH CONTROL MECHANISM

Filed Oct. 12, 1925

1,566,508

Inventor:
Swan A. Sandberg
By Wilson & McCanna Attys.

Patented Dec. 22, 1925.

1,566,508

UNITED STATES PATENT OFFICE.

SWAN A. SANDBERG, OF LEE CENTER, ILLINOIS.

CLUTCH-CONTROL MECHANISM.

Application filed October 12, 1925. Serial No. 61,909.

*To all whom it may concern:*

Be it known that I, SWAN A. SANDBERG, a citizen of the United States, residing at Lee Center, in the county of Lee and State of Illinois, have invented certain new and useful Improvements in Clutch-Control Mechanism, of which the following is a specification.

This invention relates to clutch control mechanisms particularly designed and intended for use on tractors.

The principal object of the invention is to provide an attachment of a simple construction and easy to install to enable the safe, positive control of the clutch from any point in front of or to the rear of the tractor or from either side thereof.

Another object of the invention is to provide an adjustable operating connection between the control mechanism and the clutch pedal allowing for variations in the position of the pedal or differences in the adjustments of the clutch on different tractors.

A still further object of the invention is to provide an attachment of the character described which is readily convertible from remote control for control by the operator on the tractor itself.

These and other objects of the invention will be described more fully in the course of the following specification in which reference is made to the accompanying drawing, wherein—

Figure 1:
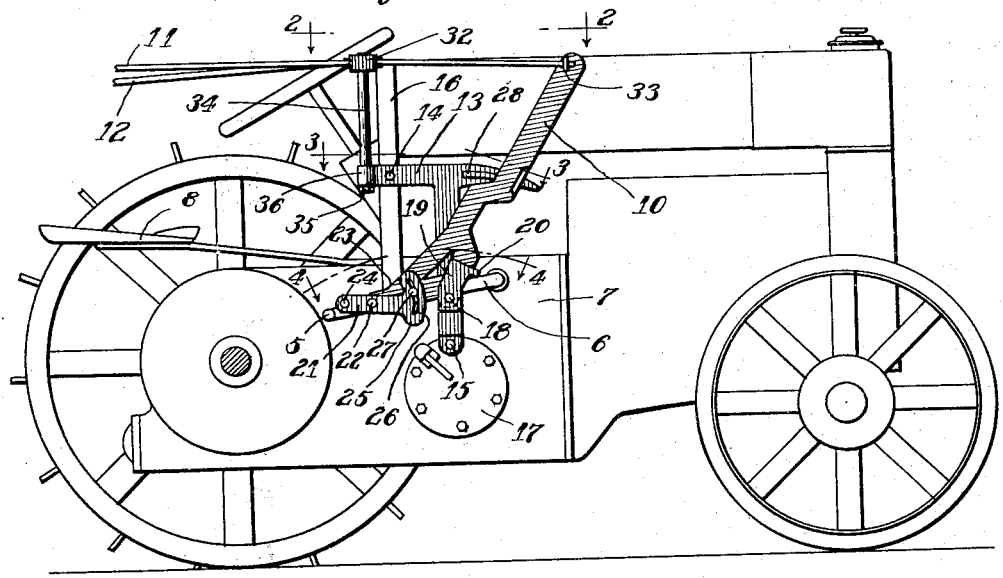
Figure 2:
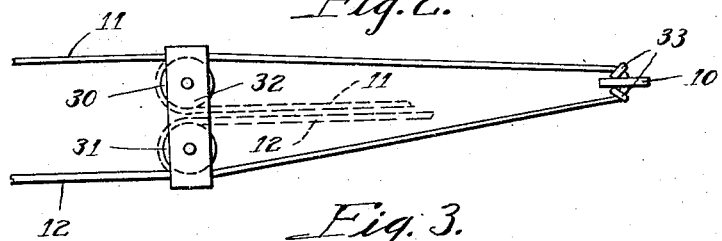
Figure 3:
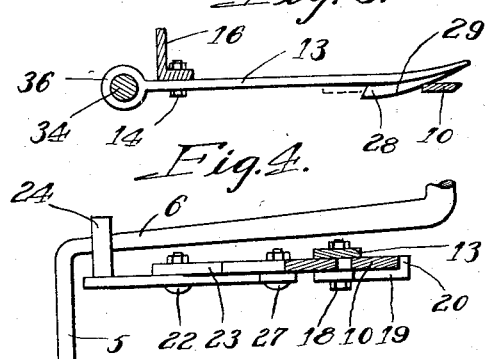
Figure 4:
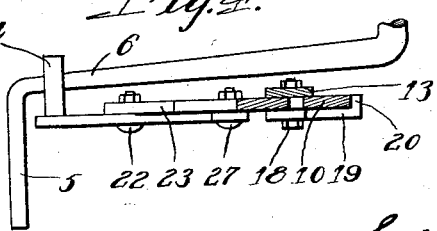

Fig. 1 is a side view of a tractor showing a clutch control applied thereto in accordance with my invention, one of the rear traction wheels being removed more readily to disclose the invention;

Fig. 2 is a fragmentary plan view showing cable connections with the hand lever for remote control of the clutch, and illustrating two methods for guiding the cables in controlling the clutch from either end of the tractor. This view is taken on the line 2—2 of Fig. 1; and Figs. 3 and 4 are enlarged, fragmentary, horizontal sections taken on the lines 3—3 and 4—4, respectively, of Fig. 1 looking in the direction of the arrows.

The invention is capable of general application to motor vehicles but, as stated above, is particularly designed and intended for use on tractors. The tractor illustrated in Fig. 1 is of the conventional type and has a clutch pedal 5 provided on the end of a lever 6 extending into the housing 7 for connection with the usual clutch release collar. The pedal and lever will hereinafter be referred to collectively as the clutch pedal. The pedal 5 may be operated by foot pressure when the operator is seated on the tractor at 8 but, according to the present invention, it is contemplated to operate the pedal by a hand lever 10 either directly by the operator upon the tractor itself or through cable connections 11 and 12 extending to a remote point such, for example, as a trailing vehicle or, in certain instances, a leading vehicle. The cables are also capable of extension laterally for controlling the clutch from points at either side of the tractor.

The clutch control mechanism which includes the hand lever 10 and the cables 11 and 12 comprises a bracket 13 attached to the tractor in any convenient manner as by means of bolts 14 and 15 at the dashboard 16 and cover plate 17. The particular method of application is, of course, relatively unimportant. The lever 10 is pivoted to the bracket 13 at 18 between the bracket 13 and an arm 19 extending in spaced relation to the bracket 13 and welded or otherwise suitably secured thereto at its inner end. In the normal inoperative position of the lever 10, shown in Fig. 1, in which position the clutch pedal is in engaged position, the lever 10 rests in contact with a lug 20 on the outer end of the arm 19 serving as a stop and definitely determining the inoperative position of the lever for the purposes of the ·adjustment of a clutch-engaging and operating element 21. The element 21 is in the form of an auxiliary lever pivoted at 22 to an extension 23 off the bottom of the lever 10. The lever 21 has a pin 24 at its free end resting in contact with the clutch pedal, as most clearly appears in Fig. 4. The opposite end of the lever 21 is formed in a sector 25 having an elongated slot 26 therein in which a bolt 27 passing through the extension 23 of the lever 10 is arranged to engage to clamp the lever 21 in adjusted position with respect to the lever 10 with the pin 24 touching or nearly touching the clutch pedal. The position of the lever 21 will, of course, depend on the degree of adjustment of the clutch in each particular case and upon the extent of throw of the clutch collar necessary in disengaging the clutch. The variable operating connection afforded at the lever 21 adapts the device to use on practically any tractor.

The clutch pedal tends normally to move to engaged position and, when moved to disengaged position by the lever 10, places constraint upon the lever to move to the normal inoperative position shown in Fig. 1. A stop is provided at 28 on the bracket 13 for holding the lever in operative position. Leading to the stop 28 and forming a guide for the lever in its movement from inoperative position to operative position is a cam surface 29. The lever 10 is flexed outwardly with respect to the tractor in riding over the cam surface 39 and springs inwardly into engagement behind the stop 28 when it reaches operative position, that is, with the clutch fully disengaged. In releasing the lever 10 from its cocked position, it is necessary to flex it outwardly beyond the edge of the stop 28 whereupon the spring pressure arising in the clutch of the tractor will serve to move the lever 10 to inoperative position as above described.

The cable 11, as shown in Fig. 2, passes about a pulley 30 and the cable 12 about a pulley 31 mounted in a yoke 32, both having connection with the hand lever 10 suitably by means of knots 33, as shown. These cables extend either rearwardly to a trailing vehicle implement or may be extended forwardly, as indicated in dotted lines, to a leading implement. It is also obvious that they may lead to one side or the other, if desired. The cable 11, when pulled, cocks the lever 10, and the cable 12 releases the same. This is by virtue of the fact that the guides for the cables afforded by the pulleys 30 and 31 are to either side of the plane of movement of the lever 10. In the cocking of the lever, the pull on the cable 11 draws the lever across the cam surface 29 and into engagement behind the stop 28, the lever being flexed in riding over the edge of the stop, as described above. In the releasing of the lever, a pull communicated on the cable 12 flexes the lever outwardly clear of the stop 28 and upon the release of the cable, the spring pressure normally moving the clutch pedal to engaged position will serve to move the lever 10 with it to inoperative position.

The yoke 32 carrying the pulleys 30 and 31 is suitably mounted on a bracket 34 which, in turn, is separably mounted on the bracket 13 and may be secured by means of a nut 35 in a socket 36 provided on the bracket 13. The bracket 34 will, of course, be used only in case of remote control of the clutch and may be removed in the event the operator seated on the tractor desires to control the clutch from his position. In that case, he may grasp the handle 10 or may use the cables if convenient or preferable. In this case, as in the case of remote control, it will be apparent that the operation of the clutch is absolutely safe and positive. Accidents are entirely avoided which sometimes resulted where the foot slipped from the clutch pedal at an inopportune moment. The mechanism described is capable of holding the clutch disengaged positively for any desired length of time without likelihood or, in fact, possibility of its becoming engaged.

I claim:

1. In a tractor, the combination with a clutch pedal, of a single hand lever for operating said pedal by pivotal movement from an inoperative to an operative position, a support for mounting said lever on said tractor, a clutch-engaging and operating element on said lever adjustable thereon for engagement with said clutch pedal with said lever in inoperative position, said element comprising an auxiliary lever pivoted to said hand lever intermediate its ends having its free end for engaging the pedal, and an adjustable clamping member at its other end to cooperate with the hand lever to secure said auxiliary lever in adjusted relation to said hand lever.

2. In a tractor, the combination with a clutch pedal, of a single hand lever for operating said pedal by pivotal movement from an inoperative to an operative position, a support for mounting said lever on said tractor, and a clutch-engaging and operating element on said lever adjustable thereon for engagement with said clutch pedal with said lever in inoperative position, said element comprising an auxiliary lever pivoted to said hand lever intermediate its ends having its free end for engaging the pedal and having a sector on its opposite end for bolting said auxiliary lever in adjusted position on said hand lever where the free end is touching or nearly touching the clutch pedal.

3. In a tractor, the combination with a clutch pedal, of a hand lever for operating said pedal by pivotal movement from an inoperative to an operative position, a support for mounting said lever on said tractor, a stop on said support to limit the movement of said lever to inoperative position, and an adjustable operating connection for said lever with said pedal to arrange to have the clutch pedal approximately in fully engaged position with said lever in inoperative position.

4. In a tractor, the combination of a clutch pedal tending normally to move to engaged position, a hand lever for operating said pedal by pivotal movement from an inoperative to an operative position, means for holding said lever in operative position with the clutch pedal in disengaged position, a stop for limiting the movement of said lever and determining its inoperative position, and an adjustable operating connection between said lever and said pedal to permit adjustment so that said clutch pedal is approximately in fully engaged position with said lever in inoperative position.

5. In a clutch control mechanism, the combination with a clutch pedal tending normally to move from disengaged to engaged position, of a hand lever for moving the same from engaged to disengaged position, a stop to hold said lever in its operative position with the clutch disengaged, and remotely controllable means for operating said lever comprising a pair of cables one of which when pulled cocks said lever in operative position, and the other when pulled serves to release said lever.

6. In a clutch control mechanism, the combination with a clutch pedal tending normally to move from disengaged to engaged position, of a hand lever for moving the same from engaged to disengaged position, a stop for holding said lever in its operative position with the clutch disengaged, a portion of said lever being arranged to be flexed to move past or over said stop, a cam for guiding said lever from inoperative position to operative position behind said stop, and remotely controllable means for operating said lever, said means when operated for disengaging said lever being arranged to flex the same away from said stop to permit its release for movement to inoperative position.

7. In a clutch control mechanism, the combination with the clutch pedal tending normally to move from disengaged to engaged position, of a hand lever for moving the same from engaged to disengaged position, a stop to hold said lever in its operative position with the clutch disengaged, a guide for said lever for its movement from inoperative position to operative position behind said stop, said lever being arranged to be flexed to move past or over said stop, and remotely controllable means for operating said lever comprising a pair of cables one of which when pulled cocks said lever in operative position, and the other when pulled serves to release said lever, and guides for said cables to either side of the plane of movement of said lever whereby pulls on said cables tend to flex the lever in either direction as desired to release or cock the same.

8. In a clutch control mechanism, the combination with a clutch pedal tending normally to move from disengaged to engaged position, of a hand lever for moving the same from engaged to disengaged position, a stop to hold said lever in its operative position with the clutch disengaged, a guide for said lever for its movement from inoperative position to operative position behind said stop, said lever being arranged to be flexed to move past or over said stop, and remotely controllable means for operating said lever comprising a pair of cables one of which when pulled cocks said lever, and guides for said cables to either side of the plane of movement of said lever whereby pulls on said cables tend to flex the lever in either direction as desired to release or cock the same, said guides permitting extension of said cables for controlling the movements of said lever from remote points from the lever beyond the guides, or from the guides beyond the lever or to either side of the guides and lever.

9. In a clutch control mechanism for tractors, the combination of a main supporting bracket to be mounted on the tractor, of a hand lever pivoted on said bracket having operative connection with the clutch pedal of the tractor, cables attached to said lever for extension to a remote point from which the clutch is to be controlled, and a separable cable guide bracket mounted on said supporting bracket.

10. In a clutch control mechanism for tractors, the combination of a main supporting or mounting bracket secured demountably on the tractor, a lever pivotally mounted on said bracket, a stop for holding said lever in operative position with the clutch disengaged, a cam on said bracket for guiding said lever from inoperative to operative position, said lever being arranged to flex in riding on said cam for movement over said stop, a pair of cables attached to said lever for remote control thereof, one of which when pulled serves to cock the same behind said stop and the other of which when pulled serves to release the same for movement away from said stop to inoperative position, and cable guides on said bracket.

In witness of the foregoing I affix my signature.

SWAN A. SANDBERG.